June 29, 1926. 1,590,870
C. F. WILLIAMS
OIL SEPARATING APPARATUS
Filed April 30, 1925
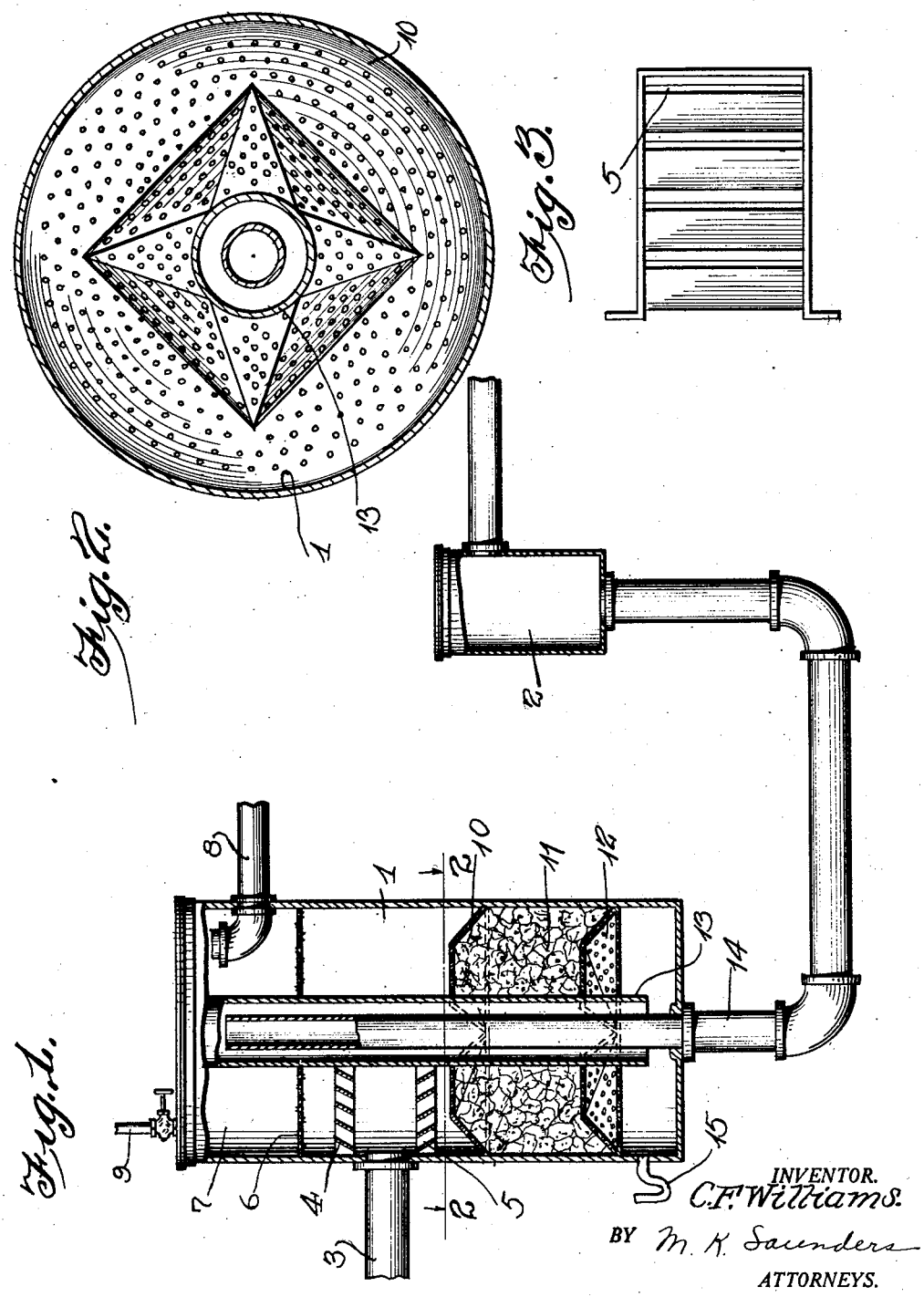
INVENTOR.
C. F. Williams.
BY M. K. Saunders
ATTORNEYS.

Patented June 29, 1926.

1,590,870

UNITED STATES PATENT OFFICE.

CHARLES F. WILLIAMS, OF PHILADELPHIA, PENNSYLVANIA.

OIL-SEPARATING APPARATUS.

Application filed April 30, 1925. Serial No. 26,947.

This invention relates to means for separating oil from water and the object of my invention is to provide an apparatus for purifying the bilge water in vessels so that it may be discharged into harbors, or other bodies of water, without polluting the waters thereof.

Another object of my invention is to reclaim the oil from bilge water in such form that it can be used in the ship or other vessel in which it has accumulated.

I accomplish the above and other objects of the invention, which will become apparent as the description proceeds, by means of the apparatus shown in the accompanying drawings, in which Figure 1 is a view, partly in section, of the apparatus embodying my invention;

Figure 2 is a horizontal sectional view on the line 2—2 of Figure 1; and

Figure 3 is a top plan view of a set of louvre plates.

In the drawings, in which like reference characters indicate like parts on all the figures thereof, 1 indicates the separating tank and 2 the overflow tank. The separating tank 1 is provided with an inlet 3 through which the bilge water in a ship is 'pumped, louvre plates 4 and 5 being located above and below the inlet and adjacent thereto. The louvre plates are located in such relation to the inlet that the stream of oily bilge water entering the tank 1 will impinge against them.

The oily content of the bilge water is composed of oil particles which, as is well known, consist of minute gas bubbles held together in globular form by a surface tension layer of liquid. These particles are held in suspension in the liquid forming the bilge water.

The impact of the bilge water against the louvre plates will overcome the surface tension of the oil particles, thus releasing the gas which will rise to the top of the tank after passing through the apertured plate 6. While a large proportion of the oil will be separated by the impact of the bilge water against the upper louvre plates 4, the impact of the residue falling against the lower louvre plates 5 will release the remainder of the oily particles.

The oil particles retained in the compartment 7, above the plate 6, may be drawn off through the pipe 8 when desired, for use in other parts of the vessel. A gas escape valve 9 is provided at the top of the tank in order to prevent the pressure therein rising above that of the atmosphere.

The bilge water, thus freed from oil, tends to sink to the bottom of the tank, passing first through the perforated plate 10, which is preferably formed with radial sections of pyramidal form. After passing through the plate 10, the bilge water enters into the filtering compartment, which is filled with suitable filtering material 11, and from there through the perforated lower plate 12, which may be similar to the plate 10, or may be of plane formation.

The perforations in the plate 6 are preferably formed by striking up apertures from opposite sides of the plate. The perforations in the plates 10 and 12 may be similarly formed, if so desired.

Extending vertically through the center of the tank, is a pipe 13 the lower extremity of which is spaced from the bottom of the tank. Concentric with and mounted within the pipe 13 is a second pipe 14 which extends through the bottom of the tank 1. The upper end of the pipe 14 is spaced from the top of the tank. The water, freed from oil and other impurities, settling to the bottom of the tank, will rise in the pipe 13 until it reaches the top of the pipe 14 into which it will flow.

The pipe 14 is connected with the receptacle 2 which serves as an overflow and equalizing tank. The water accumulating in the tank 2 may then be discharged into a river or harbor without danger or polluting the waters thereof.

A water seal or inlet 15 is provided below the filter compartment in order to admit water to the tank, whereby the lower compartment of the tank may be kept filled with water. This is of advantage in the event that the pump should pump oil unmixed with water into the tank. The inlet 15 is provided with a suitable valve. By providing such a water inlet, the compartment for the water, below the filter compartment may be kept filled with water, thereby preventing oil being drawn into the overflow tank.

While I have described my invention in connection with the purifying of bilge water so that it may be pumped into rivers or harbors, it is obvious that the apparatus is equally applicable for reclaiming oil from the water used as ballast in oil tankers. The apparatus may also be used for separating water from oil in oil sumps and similar places where oil and water have become mixed.

My invention may also be used with advantage for separating any liquid that is lighter than water when it has become mixed therewith, thereby permitting water from dye works and similar establishments to be clarified and discharged into rivers or harbors without polluting the waters thereof.

Having thus described my invention, what I claim as new and desire to secure by Letters Patent is:—

1. In a device of the class described, a separating tank, an inlet for admitting a fluid mixture thereto, means adjacent the inlet for separating a lighter from a heavier liquid in said mixture and deflecting the liquids in opposite directions, and independent means for withdrawing the two liquids from said tank.

2. In a device of the class described, a separating tank, an inlet for admitting a fluid mixture thereto, means in the path of the incoming mixture for separating a lighter liquid from a heavier liquid in the mixture and deflecting the separated liquids in different directions, means for clarifying the heavier liquid, and an overflow for the heavier liquid.

3. In a device of the class described, a separating tank, means for admitting a mixture containing water and a lighter liquid thereto, means in the path of the mixture for separating the lighter liquid from the water, mean for clarifying the water, said tank having a compartment for the clarified water, and means for admitting water to said compartment from the exterior of the tank whereby the lighter liquid is prevented from being drawn into the said compartment.

4. In a device of the class described, a separating tank, an inlet for admitting a liquid mixture thereto, impact means in the path of the incoming mixture for separating the lighter liquid constituents of the mixture from the heavier constituents and deflecting the separated liquids in different directions, filtering means for the heavier constituents of the mixture, and means for withdrawing the said heavier constituents from the tank.

5. In a device of the class described, a separating tank having an inlet for admitting a mixture of heavy and light liquids thereto, baffles adjacent the inlet in the direct path of the incoming mixture for separating the liquids from each other, said baffles being spaced from each other to provide a plurality of openings above and below the same, a compartment in the upper part of the tank for receiving the lighter liquid and a compartment in the lower part of the tank for receiving the heavier liquid and means for equalizing the liquid in said last named compartment.

6. In a device of the class described, a separating tank having an inlet for admitting a mixture of heavy and light liquids thereto, baffles in the path of the incoming mixture, said baffles being arranged in oppositely inclined series so as to direct the lighter liquid upwardly and the heavier liquid downwardly, and a perforated retaining plate in the upper part of the tank forming a compartment for the lighter liquid.

7. In a device of the class described, a separating tank having an inlet for admitting a mixture of heavy and light liquids thereto, upper and lower baffles in the path of the incoming mixture, the upper baffles being inclined upwardly and spaced from each other, whereby the lighter liquids will impinge thereon and be directed upwardly thereby being separated from the heavier liquids.

8. In a device of the class described, a separating tank having an inlet for admitting a mixture of heavy and light liquids thereto, baffles arranged in series above and below said inlet and in the path of the incoming mixture, the baffles of each series being spaced from each other and having openings above and below the same, whereby the lighter liquids will be directed upwardly and the heavier liquids will be directed downwardly, and separate compartments for the liquids.

In testimony whereof I affix my signature.

CHARLES F. WILLIAMS.